Nov. 14, 1950 R. H. CAMPBELL 2,529,912
INTERCOMMUNICATING APPARATUS
Filed Aug. 13, 1947
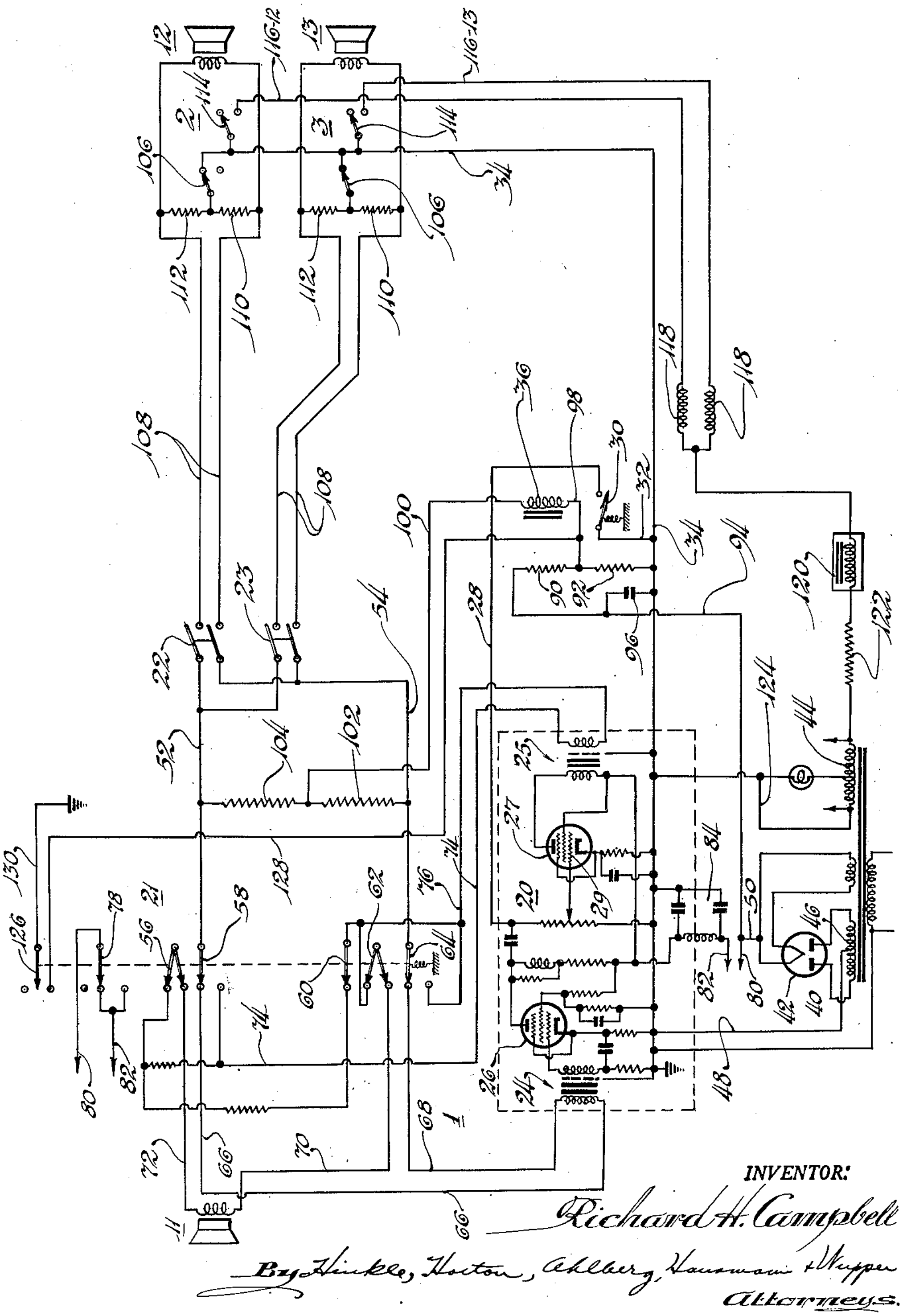
INVENTOR:
Richard H. Campbell
By Hinkle, Horton, Ahlberg, Hausmann & Wupper
Attorneys.

Patented Nov. 14, 1950 2,529,912

UNITED STATES PATENT OFFICE 2,529,912

INTERCOMMUNICATING APPARATUS

Richard H. Campbell, Racine, Wis., assignor to Webster Electric Company, Racine, Wis., a corporation of Delaware Application August 13, 1947, Serial No. 768,367

15 Claims. (Cl. 179—1)

The present invention relates to communication apparatus and more particularly to intercommunicating apparatus.

The primary object of the present invention is to provide new and improved communication apparatus including at least one station of the master type comprising communication direction controlling switch means and one or more remote or speaker stations in which the master station is prevented from listening in on the remote stations without the latter's knowledge. In other words, the apparatus is so constructed and arranged as to assure absolute privacy to the remote stations.

A further and more specific object of the invention is the provision of new and improved apparatus of the character described in the preceding paragraph including an amplifier and a silencing relay controlling the operativeness of the amplifier which is under the conjoint control of the communication direction controlling switch means at the master station and a control switch at the remote stations, the control being so constructed and arranged that the relay cannot be operated to render the amplifier inoperative when the apparatus is conditioned for transmission from the master to the remote station and that the relay cannot be operated to render the amplifier operative when the apparatus is conditioned for transmission from the remote to the master station except under the control of a person at the remote station.

A further object of the present invention is to provide a new and improved apparatus of the character set forth above, which includes, in addition, means for enabling the remote stations to originate calls.

The apparatus of this invention is particularly well adapted for use in nurses' homes, hotels, dormitories, schools, office suites, and institutions, all of these being places wherein privacy is desired.

Other objects and advantages of the present invention will become apparent from the ensuing description of an embodiment of the invention, in the course of which reference is had to the accompanying drawings, the single figure of which illustrates diagrammatically communication apparatus constructed and arranged in accordance with the present invention.

Referring now to the drawing, there is illustrated an intercommunication system, of the loud speaking type, wherein communication may be carried on between a first station, called a master station, and one or more remote or substations under the control of communication direction controlling switch means at the master station.

The master station is indicated by the reference character 1 and two of a number of substations are indicated by the reference characters 2 and 3. The stations are provided with translating devices capable of being used both as receivers and transmitters, these being the loud speakers 11, 12 and 13 at the three stations, respectively, which may be of the well known permanent magnet type.

The master station is provided with an amplifier 20, a combined communication direction and power control switch 21, and station selector switches 22 and 23 individual to stations 2 and 3, respectively. The amplifier may be of any well known construction and it will not be described in detail further than is necessary for an understanding of the present invention. In brief, it comprises an input transformer 24 and an output transformer 25 coupled by a pair of grid controlled tubes 26 and 27.

In accordance with one of the features of the present invention, the operativeness of the amplifier is controlled in such a way that the master station is prevented from listening in on the remote stations 2 and 3 without the knowledge and consent of the latter. The operativeness is controlled by means including a conductor 28 through which the grid 29 of tube 27 is grounded to render the amplifier inoperative. The ground circuit is completed through the conductor 28, a switch 30 biased to a normally open position, a conductor 32 connected to a common ground conductor 34. It may be well at this point briefly to refer to the fact that the switch 30 is operated by a coil 36, the latter being effective to close the switch when energized, and that the coil and switch together constitute what may be termed a silencing relay.

Power is supplied to the amplifier from a suitable source of alternating current through power supply means indicated generally by the reference character 40 and comprising a rectifier tube 42 through which plate voltage is supplied to the tubes and a filament secondary winding 44 through which power is supplied to the filaments of the tubes 26 and 27 in known manner. The plate voltage supply means includes a secondary winding 46, the midpoint of which is connected by conductor 48 to the common ground conductor 34. The other side of the plate voltage supply includes a conductor 50, from which connections lead to the power and communication direction control switch and the relay winding 36, as will be described in detail shortly.

The power and communication direction control switch 21 is of the three position type. In its indicated middle position, it occupies what is called a listen position in which the loud speaker 11 is connected to the output transformer 25, and a communication circuit comprising conductors 52 and 54 is connected to the input transformer 24. In its lowermost position, the switch 21 occupies what is called a talk position, in which the connections of loud speaker 11 and the line 52, 54 are reversed. In its uppermost position, the loud speaker 11 is connected directly to the line 52, 54. In the talk and listen positions the plate voltage supply circuit is completed, but in the talk position the relay coil 36 cannot be energized because the supply voltage is shorted out so that the amplifier cannot be rendered inoperative and the master station can call the remote stations.

The connections of the loud speaker and the circuit 52, 54 are controlled by switch blades 56, 58, 60, 62 and 64 of the switch 21. In the listen position of the switch, line 52, 54 is connected to the input transformer of the amplifier through the switch blades 58 and 64 and conductors 66 and 68. At the same time, loud speaker 11 is connected to the output transformer through conductors 70 and 72, switch blades 56 and 62 and conductors 74 and 76. In the talk position, the connections of the loud speaker and line are reversed, the loud speaker being connected to the input circuit through the switch blades 56 and 62 and lines 52 and 54 being connected to the output transformer through switch blades 58 and 64. In the idle position of the switch, loud speaker 11 is connected directly to line 52, 54 through the switch blades 58 and 64.

Plate voltage is supplied to the amplifier in the listen and talk positions of switch 21 by means including switch blade 78 and conductors 80 and 82 which are connected to conductor 50 and a filter 84 through which voltage is supplied to the plates of tubes 26 and 27 in known manner. In the third or idle position, no plate voltage is supplied to the tubes.

In accordance with the present invention, the operativeness of the amplifier is so controlled that station 1 cannot listen in or eavesdrop on the remote stations 2 and 3 without the knowledge of the latter. The remote stations are provided with control means operable to render the amplifier operative so that communication may be had from the remote stations to the master station. The arrangement is also such that the master station can call or talk to the remote stations at any time.

The amplifier operativeness controlling means includes, as already indicated, the silencing relay comprising switch 30 and coil 36. The coil is so controlled that it is energized to close switch 30 and thereby to render the amplifier inoperative by grounding the grid 29 of tube 27 whenever the communication direction control switch 21 is in its indicated listen position and a remote station is selected and the previously referred to control switch at the remote station is in its normal position. Further, the control is such that the coil 36 is prevented from being energized when the switch 21 is operated to its talk position.

The coil is connected to the plate voltage supplying means through a voltage divider comprising the series connected resistors 90 and 92, the former of which is connected by conductor 94 to conductor 50 and the latter of which is connected to the ground conductor 34. The resistors are shunted by a filter capacitor 96. The coil is connected to the junction of resistors 90 and 92 by a conductor 98 and under certain conditions is energized by the voltage drop across resistor 92. The coil is also connected by conductor 100 to the junction of resistors 102 and 104 which are connected in series across the communication line 52, 54 through which a control circuit for the coil is extended to the remote stations 2 and 3.

The remote stations 2 and 3 are each provided with a control switch 106 so constructed and arranged in circuit that in one position it completes an energizing circuit for the coil 36 should the master station attempt to listen in on the remote staton and thus renders the amplifier inoperative. Assuming that station 1 desires to listen in on station 2, then selector switch 22 is closed. The coil 36 is then connected to the remote station through conductor 100, the resistors 102 and 104, circuit 52, 54, switch 22, the pair of interstation conductors 108, resistors 110 and 112 at the remote station connected in series across conductors 108, the control switch 106 connected to the junction of the resistors, and the common ground connector 34. This circuit connects the coil 36 across the resistor 92 with the result that it is energized and closes switch 30, thereby rendering the amplifier 20 inoperative and making it impossible for station 1 to listen in to station 2 without the knowledge and consent of the latter. However, station 1 can listen to station 2 when the switch 106 is moved to its other position wherein the energizing circuit for coil 36 is broken. As soon as this circuit is broken the switch 30 is returned to its open position, thereby rendering the amplifier operative.

The apparatus at station 3 is like that at station 2 and will, therefore, not be described, although like parts will be indicated by like reference characters.

The remote stations are also provided with means for calling the master station. This means includes a switch 114 movable from a normal open circuit position to a circuit closing position in which a circuit is completed between conductors 116—12 or 116—13, and 34. When either of these circuits is closed, a visual indicator operating coil 118 individual to the calling station is energized as is a common buzzer 120. The energizing circuit is completed through a resistor 122, the secondary winding 44 and a conductor 124.

The master station can call a remote station at any time. To accomplish this, the switch 21 is provided with a switch blade 126 for shorting resistor 92 in the talk position so that the coil cannot be energized to render the amplifier inoperative. The coil is shorted through a circuit including the switch and conductors 128 and 130.

In operation, the apparatus is supplied with energy from a convenient source, such as the ordinary 110-volt power supply lines. The rectifier 40 is immediately placed in operation to supply plate voltage and the tubes are all conditioned for operation. The plate voltage supply for the tubes is completed by the switch blade 78 through the conductors 80 and 82, provided switch 21 is in its indicated position. The silencing relay is in its indicated position so that the amplifier is operative. The loud speaker 11 at the master station is connected to the output of the amplifier and the communication line 52, 54 is connected to the input.

Assuming that the master station desires to listen in to one of the remote stations, say station 2, then the selector switch 22 must be closed. When this is done, the coil 36 is energized to render the amplifier inoperative by closing switch 30 and grounding the input circuit for amplifier tube 27. It is thus impossible for the master station to listen in on a substation.

Should the master station desire to call station 2 it is necessary only that the selector switch 22 be closed and switch 21 be operated into its lowermost or bottom position. In this position, plate voltage continues to be supplied to the amplifier through the switch blade 78 and conductors 80 and 82, but coil 36 is prevented from operating switch 30 to render the amplifier inoperative because voltage supply resistor 92 is shorted, as earlier described. Consequently, the master station can call the remote station, it being remembered that in the talk position the loud speaker 11 is connected to the amplifier input and the output is connected to line 52, 54 and thence through the interstation conductor 108 to the loud speaker 12.

In order to respond to a call, the remote station must open switch 106, while the master station releases switch 21 for return to its listen position. With the switch 106 opened and switch 21 in its listen position, the coil 36 is not energized, so that the amplifier is operative, and loud speakers 12 and 11 are connected to the input and output of the amplifier, respectively.

Should the master station try to listen to some other remote station, such as station 3 when listening to station 2, whereat switch 106 is open, the amplifier is rendered inoperative because an energizing circuit for solenoid 36 would be completed through switch 106 at station 3.

Should a remote station desire to call the master station, the switch blade 114 at the former is closed, thereby to operate the visual and audible indicating means 118 and 120. To reply, the master station closes the selector switch corresponding to the calling station and calls the remote station and the latter then opens switch 106 thereat to condition the apparatus for two-way communication under control of switch 21 at the master station.

From the foregoing description of the present invention, it may be noted that it is impossible for the master station to listen in to a remote station without knowledge and consent of the latter and that this result is obtained through a simple circuit arrangement including, in the main, a single relay conjointly controlled by control means at the master and remote stations. The arrangement is also characterized by being silent in operation and in that but low voltage current need be handled by the silencing relay switch.

While the invention has been described in connection with the details of a single embodiment thereof, it should be understood that these details are not intended to be limitative of the invention, except in so far as set forth in the accompanying claims.

Having thus described my invention, what I claim as new and desire to secure by Letters Patent of the United States is:

1. Communication apparatus including an amplifier, a device usable both as a receiver and a transmitter, means including a communication control switch for selectively connecting said device to the input or output of said amplifier and energizing the amplifier to render it operative, means including a relay controlled by said communication control switch for controlling the operativeness of the energized amplifier, a second device usable as a receiver and transmitter, and means including switch means located in proximity to said second device controlling said relay for also controlling the operativeness of the energized amplifier.

2. Communication apparatus including an amplifier, a device usable both as a receiver and a transmitter, means including a communication control switch movable to talk and listen positions for selectively connecting said device to the input or output of said amplifier and energizing the amplifier to render it operative, means including a relay operable to render the energized amplifier inoperative, a second device usable as a receiver and transmitter, means including switch means located in proximity to said second device controlling said relay for rendering it effective to render the energized amplifier inoperative, and means including switch means operable by said communication control switch in its talk position for preventing said first mentioned switch means from rendering said amplifier inoperative.

3. Communication apparatus including an amplifier, a device usable both as a receiver and a transmitter, means including a communication control switch movable to listen and talk positions for selectively connecting said device to the input or output of said amplifier and energizing the amplifier to render it operative, means including a relay operable to render the energized amplifier inoperative, a second device usable as a receiver and transmitter, means including selector switch means at the first station and switch means located in proximity to said second device controlling said relay for rendering it effective to render the energized amplifier inoperative, and means including switch means operable by said communication control switch in its talk position for preventing said first mentioned switch means from operating said relay and rendering said amplifier inoperative.

4. Communication apparatus including an amplifier including a grid controlled tube, a device usable both as a receiver and a transmitter, means including a communication control switch movable to listen and talk positions for selectively connecting said device to the input or output of said amplifier, means including a relay comprising a switch operable upon energization of said relay to ground the grid of said tube for rendering said amplifier inoperative, a second device usable as a receiver and transmitter, means including switch means located in proximity to said second device for energizing the relay and operating the switch to ground said grid and thereby to render said amplifier inoperative, and means including switch means operable by said communication control switch in its talk position for preventing said first mentioned switch means from energizing the relay and rendering said amplifier inoperative.

5. In communication apparatus, amplifying means, communication control switch means operable into different positions, amplifying means conditioned for operation, means including relay means controlling the operativeness of said amplifying means and operable to render said amplifying means inoperative, switch means for operating said relay means, and means operable by said control switch in one of its positions for rendering said switch means ineffective to operate said relay means.

6. In communication apparatus, amplifying means, a first station including communication control switch means operable into talk and listen positions, amplifying means conditioned for operation, means including relay means controlling the operativeness of said amplifying means and operable to render said amplifying means inoperative, a second station including switch means for operating said relay means, and means operable by said control switch in its talk position for rendering said switch means ineffective to operate said relay means.

7. In communication apparatus, a first station having amplifying means including a grid controlled tube and means including a relay comprising switch means controlling the grid circuit of said tube for controlling the operativeness of said amplifying means and capable of rendering said amplifying means inoperative, and a second station having control switch means controlling said relay and operable to operate said relay to render said amplifying means inoperative.

8. In communication apparatus, a first station having amplifying means including a grid controlled tube, means including a relay comprising switch means controlling the grid circuit of said tube for controlling the operativeness of said amplifying means and capable of rendering said amplifying means inoperative, and a station selector switch, a second station having a control switch and a circuit connecting it to said relay through said station selector switch controlling said relay and operable to operate said relay to render said amplifying means inoperative.

9. In communication apparatus, a first station having amplifying means including a grid controlled tube and means including a relay comprising switch means controlling the grid circuit of said tube for controlling the operativeness of said amplifying means and capable of rendering said amplifying means inoperative, a second station having control switch means controlling said relay and operable to operate said relay to render said amplifying means inoperative, communication controlling switch means at the first station controlling said amplifying means and operable to condition the latter for transmission to the second station, and switch means operable by said communication controlling switch means and controlling said relay for preventing operation of said relay by the control switch means at the second station.

10. In communication apparatus, amplifying means, means including a relay comprising switch means for controlling the operativeness of said amplifying means and operable to render said amplifying means in operative, plural position communication control switch means controlling communication circuit connections to said amplifier, and means operable by said control switch means in one of its positions for preventing operation of said relay to render said amplifying means inoperative.

11. In communication apparatus, amplifying means, means including a relay comprising switch means for controlling the operativeness of said amplifying means and operable to render said amplifying means inoperative, communication control switch means having talk and listen positions controlling circuit connections to said amplifier, and means operable by said control switch means in its talk position for preventing operation of said relay to render said amplifying means inoperative.

12. In communication apparatus, amplifying means, means including a normally deenergized but energizable relay comprising switch means for controlling the operativeness of said amplifying means, plural position communication control switch means controlling circuit connections to said amplifier, and means operable by said control switch means in one of its positions for preventing energization of said relay.

13. In communication apparatus, amplifying means, means including a normally deenergized relay energizable to render said amplifying means inoperative, communication control switch means having talk and listen positions and controlling circuit connections to said amplifier, and means operable by said control switch means in its talk position for preventing energization of said relay and thus preventing said amplifying means from being rendered inoperative.

14. In communication apparatus, amplifying means, means including an energizable relay comprising switch means for controlling the operativeness of said amplifying means, plural position communication control switch means controlling circuit connections to said amplifier, other control switch means for energizing said relay means to render said amplifying means inoperative, and means operable by said control switch means in one of its positions for preventing energization of said relay means.

15. In communication apparatus, amplifying means, plate voltage supply means for said amplifying means, means including plural position control switch means for connecting said voltage supply means to and energizing said amplifying means to render the latter operative in a plurality of positions of said switch means, means including other control switch means and amplifier operativeness controlling means operable thereby to render said energized amplifier inoperative, and means operative by said first-mentioned control switch means for rendering said last-mentioned means ineffective to render said amplifying means inoperative.

RICHARD H. CAMPBELL.

REFERENCES CITED

The following references are of record in the file of this patent:

UNITED STATES PATENTS

| Number | Name | Date |
|---|---|---|
| 1,802,675 | Sisty et al. | Apr. 28, 1931 |
| 2,269,141 | Campbell | Jan. 6, 1942 |
| 2,269,144 | Campbell | Jan. 6, 1942 |
| 2,377,672 | Campbell | June 5, 1945 |